United States Patent [19]

Ossfeldt

[11] 4,099,241
[45] Jul. 4, 1978

[54] APPARATUS FOR FACILITATING A COOPERATION BETWEEN AN EXECUTIVE COMPUTER AND A RESERVE COMPUTER

[75] Inventor: Bengt Erik Ossfeldt, Huddinge, Sweden

[73] Assignee: Telefonaktiebolaget L M Ericsson, Stockholm, Sweden

[21] Appl. No.: 714,616

[22] Filed: Aug. 16, 1976

Related U.S. Application Data

[63] Continuation-in-part of Ser. No. 514,077, Oct. 11, 1974, abandoned.

[30] Foreign Application Priority Data

Oct. 30, 1973 [SE] Sweden ................ 14713/73

[51] Int. Cl.² .................... G06F 15/16; G06F 15/20
[52] U.S. Cl. ............................................. 364/200
[58] Field of Search .................... 340/172.5; 445/1; 253/153 AE; 364/200 MS File

[56] References Cited

U.S. PATENT DOCUMENTS

| | | | |
|---|---|---|---|
| 3,252,149 | 5/1966 | Weida et al. | 340/172.5 |
| 3,444,528 | 5/1969 | Lovell et al. | 364/200 |
| 3,471,686 | 10/1969 | Connell | 235/153 AE |
| 3,503,048 | 3/1970 | Avsan et al. | 340/172.5 |
| 3,517,174 | 6/1970 | Ossfeldt | 235/153 AE |
| 3,624,604 | 11/1971 | Gibbard | 340/172.5 X |
| 3,636,331 | 1/1972 | Amrehn | 340/172.5 X |
| 3,786,433 | 1/1974 | Notley et al. | 340/172.5 |
| 3,810,119 | 5/1974 | Zieve et al. | 364/200 |

Primary Examiner—Harvey E. Springborn
Attorney, Agent, or Firm—Hane, Roberts, Spiecens & Cohen

[57] ABSTRACT

In a twin computer system a two computers are timed by a common clock generator of clock pulses and are connected to each other by a cable which introduces a time delay greater than a clock pulse period. The computers process in parallel units of data from a plurality of operational units with the first of the computers being the executive computer and the second the reserve computer. The computers are identical and each includes both a first function unit and a second function unit interconnected by a bus system including order and data buses. In addition to the computers and clock generator there is apparatus for initiating the operation of both computers in a given sequence and timing by starting the first computer to process data, and then starting the second computer to process data a given period of time after the starting of the first computer, and actively connecting unidirectionally via the cable the data bus of the first computer to the data bus of the second computer for a certain length of time whereby units of data being transferred from the first function unit of the first computer to the second function unit of the first computer are also transferred to the second function unit of the second computer which correspond to said second function unit of the first computer so that the second computer is initially loaded with data being processed by the first computer. The given period of time the second computer is started after the first computer is substantially equal to the time required to transfer signals representing data from the data bus of the first computer to the data bus of the second computer.

12 Claims, 5 Drawing Figures

APPARATUS FOR FACILITATING A COOPERATION BETWEEN AN EXECUTIVE COMPUTER AND A RESERVE COMPUTER

CROSS REFERENCE TO A RELATED APPLICATION

This application is a continuation-in-part of application Ser. No. 514,077, filed Oct. 11, 1974 and now abandoned.

BACKGROUND OF THE INVENTION

This invention pertains to computer control systems and more particularly to those systems utilizing twin computers operating in parallel-synchronous cooperation.

In real time systems such as stored program controlled telecommunication systems it has been common to employ control computers using unified-bus principles. Typically, in such systems the computer which controls the telecommunication devices or units is in turn controlled by a clock generator. Within the computer the operating units are all connected to a common or unified bus. Typical unified-bus computers used in telecommunication systems are the No. 2 ESS Call Processor whose block diagram is shown on page 2634 of *The Bell System Technical Journal* of October 1969, and the computer disclosed in U.S. Pat. No. 3,631,401 and called a Direct Function Data Processor.

Such computers and particularly that of said patent have an order bus and a data bus in addition to timing circuits. It is because of the bus configuration that such computers can be easily modified, expanded or modernized as new components become available. This flexibility is highly desirable. More particularly, because a unified-bus system comprises a number of parallel wires for transmission in parallel and digital form of data (data bus), addresses and order in parallel (order bus) and to which wires all the computer parts are connected, there is obtained a modular-system principle with the function or operating units of the computer being the modules. The function units are connected to the unified-bus system in a uniform manner by uniform interfaces, for example in the form of buffer registers accessable by encoding. By choosing suitable modules there is obtained the most varying computer constructions, such as minicomputers, microcomputers, calculators or real-time computers to control simple or complicated processes.

The unified-bus modular system is also used when building real-time controlled telecommunication systems. The demands for real-time controlling of telecommunication processes often necessitate to distinguish between fast and slow acting function units, i.e. to introduce different bus systems for different data processing speeds and to provide buffer units with the interface for constituting the connection means between the bus systems. If the central function units which carry out the computers own operations and the buffer units between the central and peripheral units are constructed with very fast reacting logical components such as TTL-(Transistor-Transistor-Logic)-circuits and are connected to a central bus system, the properties of the central bus system constitute a limit which must be observed in the determination of the resulting data processing speed. The data transmission speed available on a bus is namely influenced by the interface-number, i.e., the number of connected function units, and by the physical length of the wires in the bus system. A suitable limitation of the number of central parts consequently results in optimum short processing cycles for data processing instructions transferred via the central bus system and results consequently in a very effective real-time controlling of the telecommunication process.

Since transient phenomena arise in connection with a change of the logical condition (changes in the states of the signals on the wires of the buses) of the bus system phase division of the processing cycles in necessary, and with the purpose to obtain the fastest possible data processing, the frequency of the clock generator (the basic timing of the computer) is chosen so high that the delay in time because of such transient phenomena and such reaction times of the components is just about controlled. For example, clock pulse frequencies of 20 MHz and processing cycles of 200 ns are typical.

These delays inherent in unified-bus systems can cause problems. Nevertheless, because of the modularity advantages of such systems, they are used. However, attention must be paid to the properties of such a bus system when designing processing cycles for the data processing instructions and when connecting the computer to further means, for example to a data transferring channel.

Generally there may be instructions of different types associated with processing cycles consisting of different numbers of timing phases defined by means of timing pulses generated by the clock generator. In a computer provided with the unified-bus, data transfer instructions demand the longest processing cycles because the bus system and two function units are involved, the first one sending data and the other one receiving data. Other instructions which require only one of the function units to carry out a function demand usually shorter processing cycles.

The above-discussed systems however have low reliability in telecommunication systems. A fault in the operation of the computer causes a down-time of the telecommunication process. It is possible that the down-time includes a period during which the computer sends nonsense to the devices before the fault is discovered and the whole system is cut off. The down-time includes further diagnostic time to localize the fault, as well as to repair the computer and to restart the system. There are known many methods for increasing the reliablity of a real-time system. At page 57 of *Design Of Real Time Computer Systems*, by J. Martin published in 1967 by Prentice-Hall, Englewood Cliffs, N.J., there are shown many examples of configurations using two computers. What in the present application is called "parallel-synchronous co-operation" corresponds on said page 57 to the so-called "twin-configuration". In particular, there are two substantially identical computers A and B. Both computers A and B receive the process data being processed identically. In the present application, the computer which sends process data to the telecommunication equipment is called the executive computer, while the other of the two computers is called reserve computer. The results obtained in processing by the computers are compared. If the results do not agree, the control of the telecommunication equipment is interrupted. A first down-time period exists until it is established which computer is faulty. Then the fault-free computer continues to send process data to the equipments. It is important to localize and repair the fault as soon as possible because during the period for localization and repair the reliability is the same as for a single computer system. After the repairing of the faulty computer, the twin-configuration is renewed, the repaired computer now being the reserve computer. However, the following result comparisons are meaningless as long as the reserve computer is not updated i.e., loaded with the same information being processed by the executive computer. Thus it is known to allow a second down-time period during which all updating is carried out.

SUMMARY OF THE INVENTION

It is an object of the invention to shorten the down-time of a dual or two computer system after the discovery of a fault.

The down-time is shortened by carrying out updating during the operation of the executive computer. For updating, the reserve computer is supplied not only with the process data from the telecommunication devices, but also with the results originated by the function units of the executive computer. During updating, the function units of the reserve computer are prevented from transmitting their results. After some time the results generated by the reserve computer will be the same as the results generated by the executive computer, i.e., the updating is finished without the above-mentioned second down-time period. Of course, the reliability during such updating is the same as for a single computer system. A complete updating during the operation of the executive computer is achieved by means of a data transferring channel undirected from the data bus of the executive computer to the data bus of the reserve computer. However, the use of the data transferring channel raises a serious phase displacement problem because of, for example, the transmission time across such channel as well as the times on the data buses of both computers.

It is another object of the invention to compensate for such phase displacement.

The compensation is obtained in accordance with the invention by providing apparatus for starting the reserve computer a period of time after the starting of the executive computer which is related to the time duration of the phase displacement.

BRIEF DESCRIPTION OF THE DRAWING

The features and advantages of the invention will be apparent from the following detailed description when read with the accompanying drawing which shows apparatus for practicing the invention. In the drawing.

DESCRIPTION OF THE PREFERRED EMBODIMENTS

Figure 1:
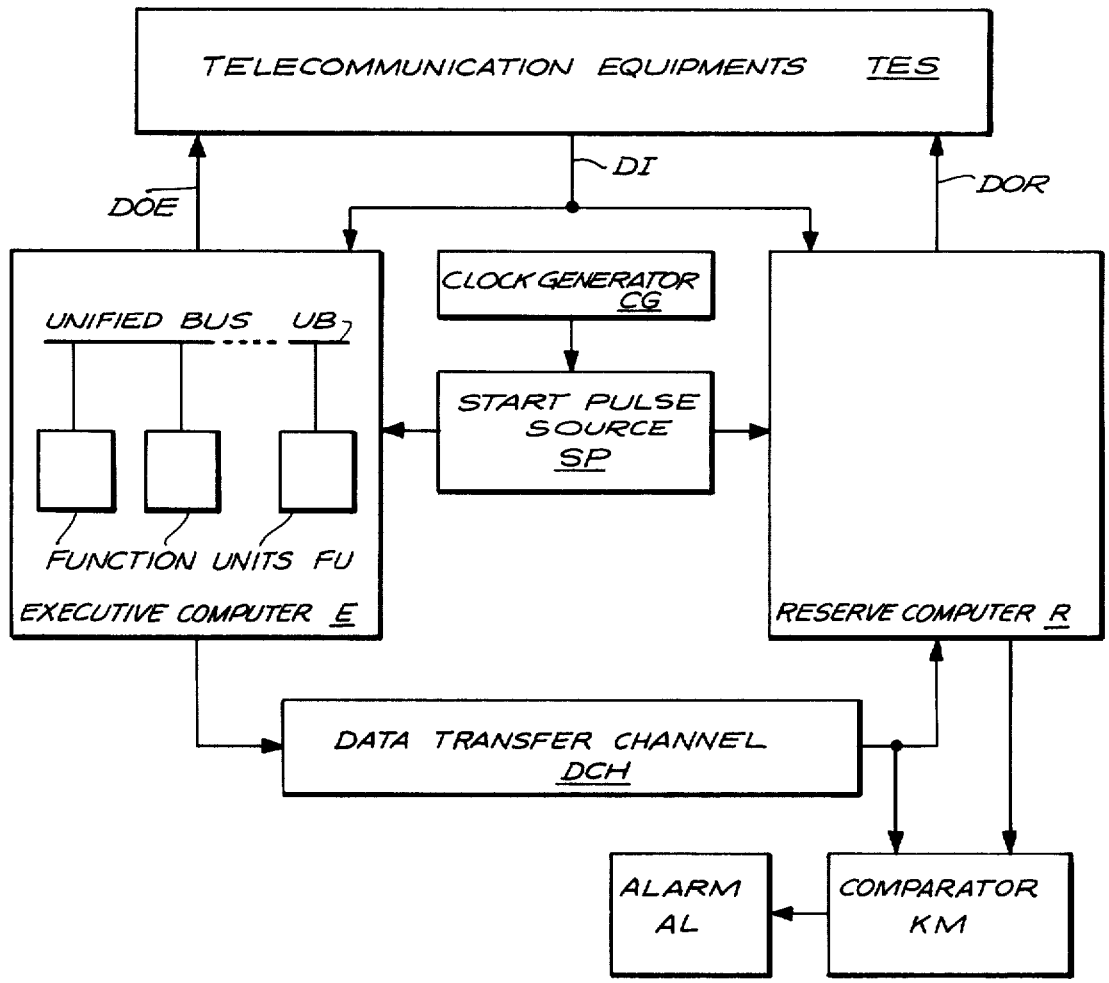
FIG. 1 is a block diagram of a telecommunication system using twin computers.

In FIG. 1 there is shown a stored-program controlled telecommunication system comprising a plurality of telecommunication equipments TES which feed state information in parallel to reserve computer R and executive computer E via the lines DI and which receive control data via lines DOE from executive computer E. Note lines DOR connected reserve computer R to the telecommunications equipment, but since the reserve computer does not control the equipment it does not send control signals thereto. The computers are for all purposes identical and simultaneously and synchronously process the same data under control of clock generator CG and start pulse source SP. The computers are of the unified bus type wherein the function units FU of the computer are all connected in parallel to unified bus structure UB. For example, one can use either of the above-mentioned computers. While the processing is going on a comparator KM compares the results from both computers. Whenever the results disagree comparator KM emits a signal to alarm AL for causing the shut-down of both computers. Error locating routines are then performed to determine which of the computers is faulty. Heretofore, once it was determined which computer broke down, the fault-free computer, say computer E, was restarted to control the system via lines DOE while the faulty computer was repaired. When the faulty computer was repaired, the system was shut down and both computers loaded with the same data and restarted. This second shut down is undesirable.

However, according to the invention the second down time for updating the reserve computer is not necessary. In particular, once the fault is localized the fault-free computer, say computer E, starts controlling the system via lines DOE while the faulty computer say computer R is repaired. When the faulty computer is repaired its bus system is connected via data transfer channel DCH to the bus system of the operating executive computer E and the reserve computer is started so that the data in the function units of the executive computer E can be loaded into the corresponding function units of reserve computer R. However, it should be noted that there is a known time delay in data travelling from the bus system of one computer via the data transfer channel DCH to the other computer. The amount of this delay is known because once the system is installed the actual delay is measured. Thus, the reserve computer is started at a time so that proper (identical) phasing is present in both computer. (Note at no time does the reserve computer R issue controls to equipments TES. It only does so when it is the executive computer).

Figure 2:
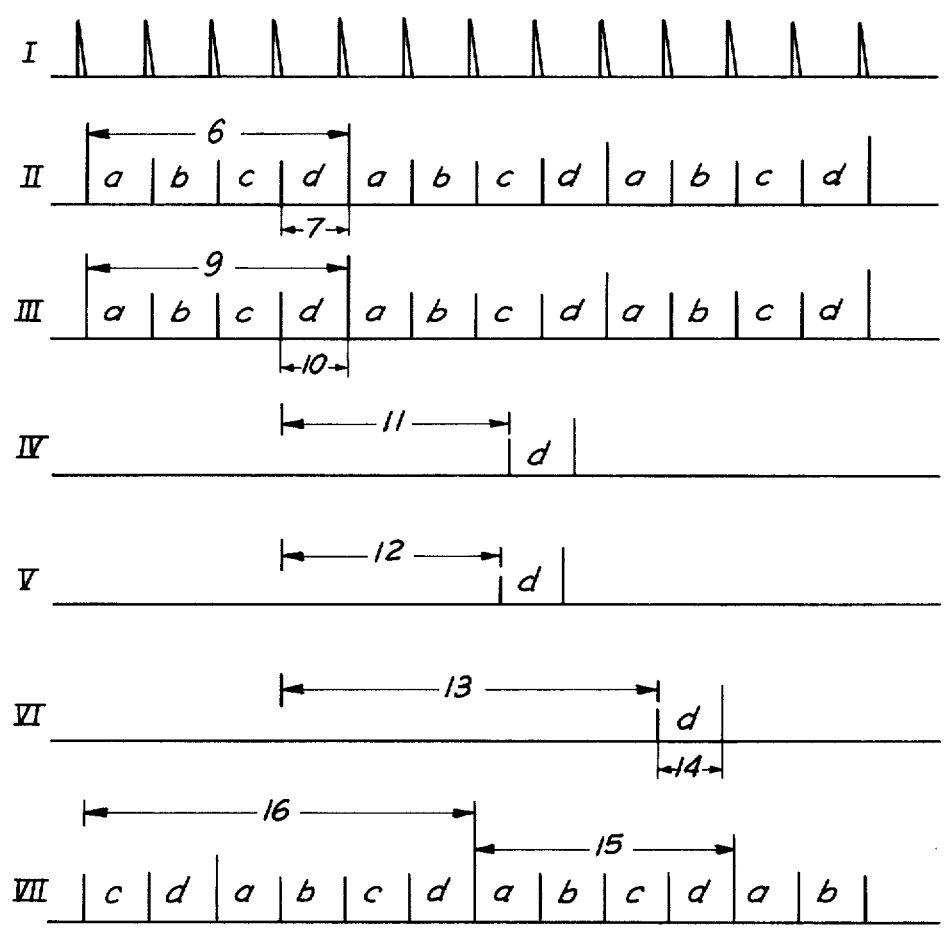
FIG. 2 is a timing diagram for explaining the operation of the system of FIG. 1.

The timing effects will become apparent from a study of FIG. 2. FIG. 2 shows timing diagrams, I, for the timing pulses produced by the clock generator CG, and II for the processing cycles associated with a number of subsequent instructions processed by the executive computer. Each processing cycle consists, according to the embodiments disclosed, of four timing phases $a$ to $d$. Timing diagram II shows the relations existing on the bus system. There is a certain inevitable phase displacement between the timing pulses and the timing phases. It is assumed that processing cycle 6 is associated with a data transfer instruction. According to the disclosed embodiments, the receiving function unit receives the transported data during the last timing phase 7 of said processing cycle 6.

Since to achieve synchronization clock generator CG also times the reserve computer the timing phases have equal lengths for both computers and the results produced by both computers in corresponding timing phases are compared. The timing diagram III of FIG. 2 shows processing cycles processed by the reserve computer which correspond to the processing cycles shown in diagram II. The computers are assumed to produce their results in synchronism without any phase displacement. Thus, in diagram III, processing cycle 9 including timing phase 10 corresponds to the processing cycle 6 and the timing phase 7 of diagram II. Using the unified-bus principle, it is convenient to connect the comparator means to the both bus systems, however in a manner which does not cause a phase displacement at the inputs of the comparator means which exceeds the length of a timing phase. The timing diagrams IV and V of FIG. 2 show examples according to which it takes the time periods 11 and 12 for transferring the logical states of the bus systems obtained during said timing phases 7 and 10, to the inputs of the comparator means. A correct comparison process is possible because the periods 11 and 12 are substantially equal. It is obvious that by means of modified periods 11 and 12, it would be possible to compensate an eventual existing phase displacement between the timing phases 7 and 10.

For updating, the reserve computer R is supplied not only with the process data from the telecommunication equipment TES but also with the results originated by the function units of the executive computer E. During updating, the function units of the reserve computer R are prevented from sending their results. After some time the results generated by the reserve computer R will be equal to the results generated by the executive computer, i.e. the updating is finished without said second down-time period. A complete updating during the work of the executive computer E is achieved by means of a data transfer channel DCH unidirected from the data bus of the executive computer to the data bus of the reserve computer. The use of the data transfer channel raises a serious phase displacement problem. The timing diagram VI of FIG. 2 shows that it takes the time period 13 for transferring the logical states obtained during the timing phase 7 from the data bus of the executive computer E through the data transferring channel to the data bus of the reserve computer R which takes the respective logical state during a displaced timing phase 14. As it is understood from the above explanations, a correct updating is only achieved if said timing phase 14 coincides with the timing phase 10.

For this reason, the system comprises start pulse source SP which initiates the start of the reserve computer R in relation to the start of the executive computer with a time-delay corresponding to such time period 13. Consequently, the timing diagram III comprising the processing cycles processed by the reserve computer has to be replaced by the timing diagram VII. The result from the instruction processed by the executive computer E during the processing cycle 6 is received not only in the addressed function unit of the executive computer during the timing phase 7, but when updating is going on also during the timing phase 14 in the corresponding function unit of the reserve computer R. Said corresponding function unit is addressed by means of the corresponding instruction which is processed by the reserve computer during a processing cycle 15 which corresponds to the processing cycle 6 due to the start of the reserve computer delayed by a delay time 16 effectively equal to said time period 13.

Thus, correct comparison according to the invention is obtained if the comparator inputs are connected to the output of the data transfer channel and to the data bus of the reserve computer.

It should be noted that the system of FIG. 1 has been simplified. In particular, there is another data transfer channel connecting the two computers in the opposite direction, and with the inputs of the comparator KM connected to the output of the other channel and the bus of the other computer. This second channel and sets of inputs is used only when the computers switch roles of executive and reserve. This second channel and comparator are not shown since once the executive and reserve computers have been established they perform no function.

Figure 3:
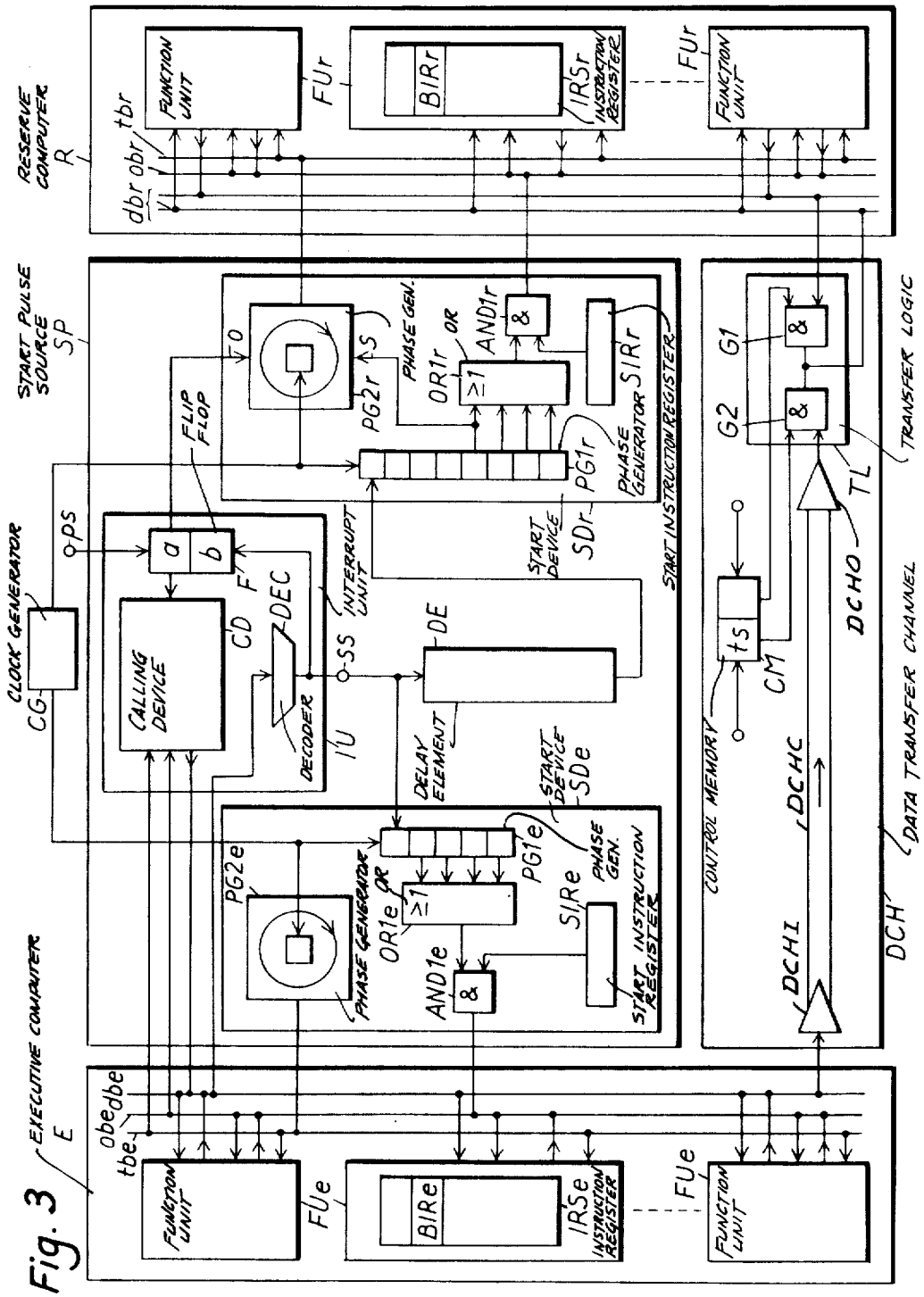
FIGS. 3 to 5 show three different embodiments of the invention wherein an executive computer is connected via a data transfer channel to a reserve computer wherein both computers are started by a common start pulse source.
Figure 4:
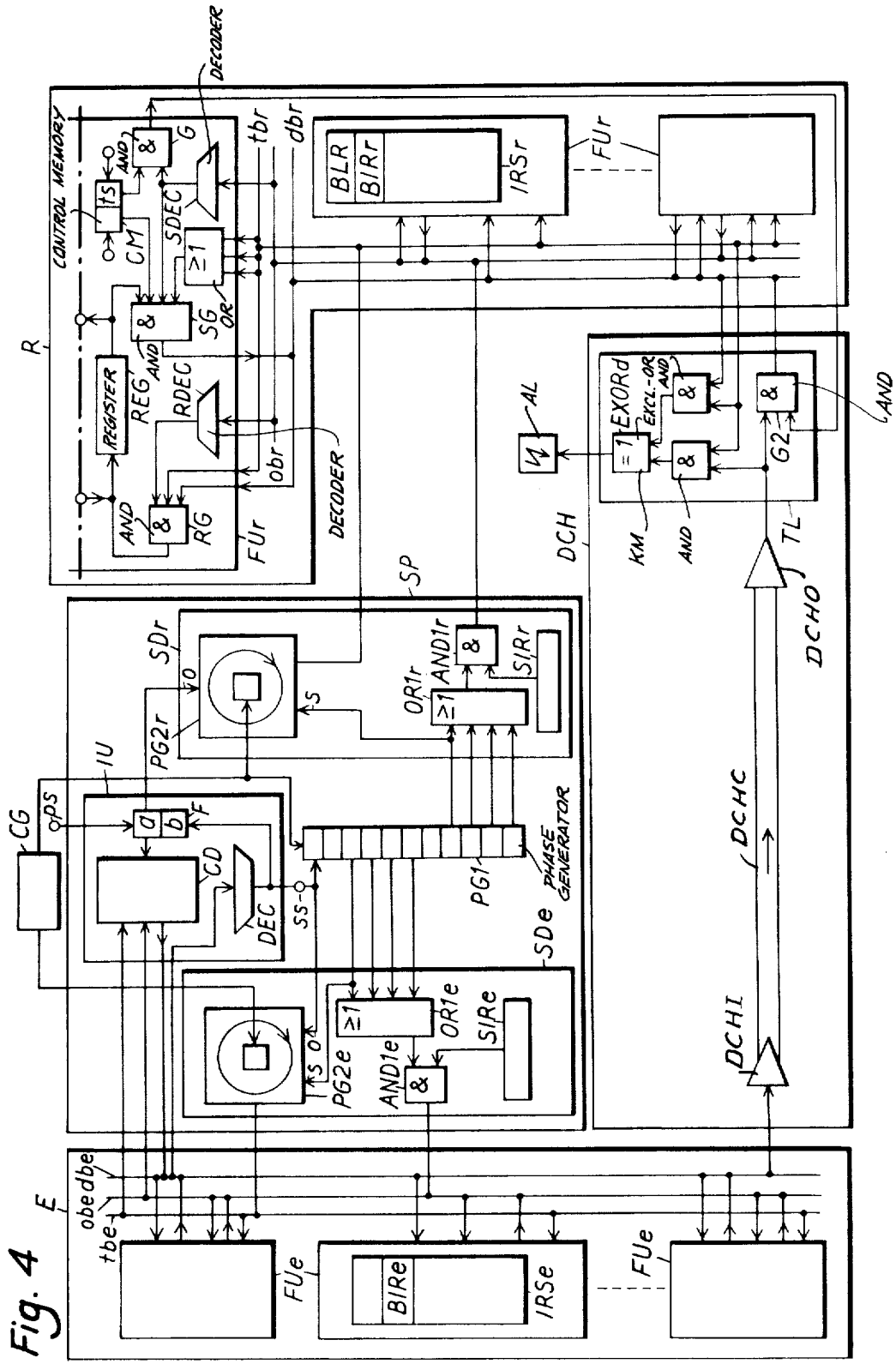
Figure 5:
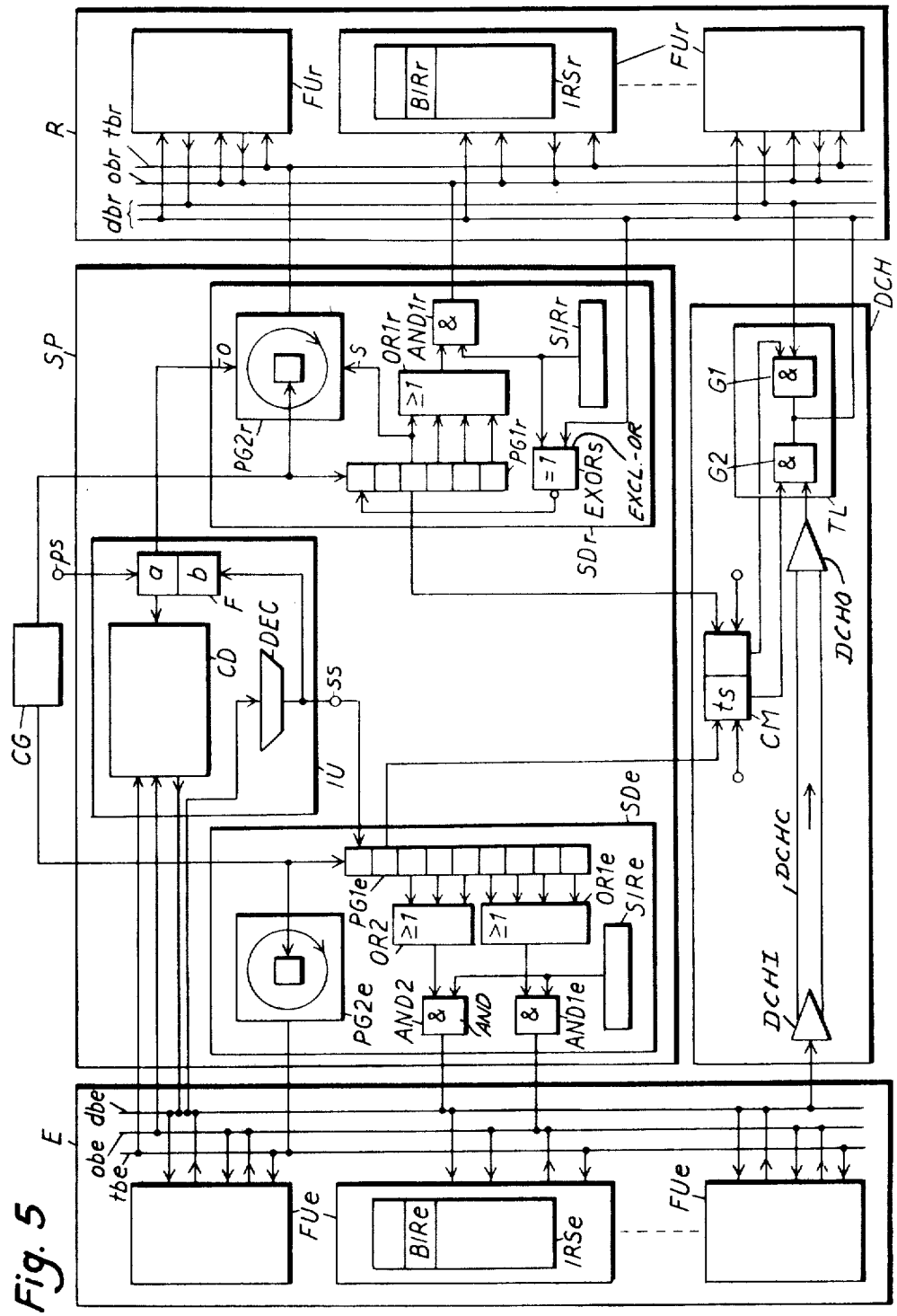

The three embodiments of FIGS. 3, 4 and 5 show the controls of a telecommunication system which include the executive computer E and the reserve computer R. In each of the embodiments there is a common clock generator CG. There are function units FU$e$, FU$r$, included in the executive computer E and the reserve computer R respectively. These function units are interconnected by means of bus systems consisting of a data bus $dbe$ and $dbr$, an order bus $obe$ and $obr$, and a timing bus $tbe$ and $tbr$, respectively. Further there is indicated that each of the computers comprises an instruction register sequence IRS$e$ and IRS$r$, respectively, which consists of a number of registers storing instructions which are read out to the order bus in turn or in another prescribed sequence because of, for example, a jump instruction. One of the instruction registers, labelled with BIR$e$ and BIR$r$, respectively, is a beginning instruction register which stores an instruction by which the operation of the computer is initiated in an absolutely determined manner. This beginning instruction register is selected with a start jump instruction transferred on the respective order bus. The timing phases of the respective computer during the following co-operation of the computers are fixed by the processing cycle of the start jump instruction, as will be described below. Using jump instructions forms part of a generally known computer technique and the processing manner of the jump instructions does not affect the inventive idea more than what has been explained in the beginning in connection with the processing of instructions by means of a unified-bus-system connected to the function units.

The proposed apparatus according to the invention to facilitate the co-operation of the unified-bus-computers comprises according to all three embodiments as main parts a data transfer channel DCH and a start pulse source SP provided with at least one delay element.

The data transfer channel DCH is connected unidirectionally from the executive computer E to the reserve computer R and is used for the co-operation between the computers, for example, for the updating of the reserve computer R which is based on the data which during the executive work are transferred on the data bus $dbe$ of the executive computer E and which via the channel DCH are transferred to the data bus $dbr$ of the reserve computer, i.e. without on the whole disturbing the real-time controlling of the executive computer E. As appeared from the introductory explanations, the function units are placed in a computer constructed according to the unified-bus-system so that the physical dimensions of the bus system are as small as possible. However, for a parallel operation of two computers there are distances that, for example, for a symmetrical transmission upon data transfer between the bus systems require that the data transfer channel include in relation to a data bus double lengths of wires, and also pulse amplifiers and pulse regenerators. The construction of the data transfer channel is indicated on the figures only principally since many constructions are usable. By way of example in each of the FIGS. 3, 4 and 5 the data transfer channel has an input indicated by amplifier DCHI connected by cable DCHC to an output indicated by amplifier DCHO. However, it must be observed that all solutions impose on the transferred data a time-delay which exceeds one period length of the timing pulses generated (one timing phase) in clock generator CG which is common to both computers.

During the updating, faulty data are produced by the reserve computer R which must not be sent to an addressed function unit FU$r$. Therefore a control memory CM is provided in the data transfer channel in order to record a transfer state in a manual or automatic manner. The control memory CM controls a transfer logic means TL which during a supplied transfer state $ts$ opens the transfer channel and prevents a transport of faulty data. In the embodiments of FIGS. 3 and 5 the data bus $dbr$ of the reserve computer R is divided into a receiving part through which data are transferred to one of the function units and a sending part through which data are transferred from one of the function units. With the aid of a first gate means G1 belonging to the transfer logic means TL such data bus parts are interconnected and disconnected, respectively, in dependence on a present normal operation of the reserve computer R and a transfer state supplied by the control memory respectively. Furthermore the transfer logic means TL connects by the aid of a second gate means G2 during updating the receiving part to the data bus $dbe$ of the executive computer E to the receiving part of the reserve computer R. In such manner the logic state of the data bus $dbe$ is transferred during the processing cycles to addressed function units of both computers.

In the embodiment according to FIG. 4 there is recorded a transfer state not generally for the whole system, but separately for each of the function units of the computers. In this case the second gate means G2 of the transfer logic means is activated to open the data transfer path from the executive computer E to the reserve computer R by the aid of a gate G of the interface of the respective function unit. (Note in FIG. 4 that the function unit FU$r$ is shown in more detail than other function units. However, the corresponding function FU$e$ is exactly the same.) The activating conditions of gate G are that a sending decoder SDEC has recognized the addressing of the respective function unit for data sending, the addressing being carried out via the order bus $obr$ of the computer, and that a transfer state $ts$ is recorded in the conrol memory CM of the function unit. This control memory CM is provided either instead of or in addition to the above mentioned common control memory in the data transfer channel DCH. Instead of a division of the data bus of the reserve computer R into a receiving and a sending part and instead of a first gate means of the transfer logic means there is used in this case in the reserve computer R a sending gate means SG included in the interface of the respective function unit. Sending gate means SG has one of its inputs connected to the control memory CM of the function unit for manual or automatic recording of the transfer state $ts$ of the function unit. Because of a recorded transferring state, sending of the data of the reserve computer R is prevented while a recorded transfer state in one of the function units of the executive computer E does not influence the data sending of the executive computer E.

For the sake of clearness there is shown in FIG. 4 only one interface which belongs to the bus system of the reserve computer R and which comprises an interface-register REG, a receiving decoder RDEC and a receiving gate means RG as well as gate G, control memory CM, sending decoder SDEC and said sending gate means SG. Via the timing bus $tbr$ of the bus system the sending and receiving gate means respectively are controlled so that an activation is obtained only during the timing phases intended for sending and receiving. Data sending from the interface register via the sending gate means SG to the data bus $dbr$ of the bus system and data receiving from the data bus of the bus system via the receiving gate means RG to the interface register, respectively, takes place if the sending decoder SDEC and receiving decoder RDEC, respectively, connected to the order bus $obr$ of the bus system recognize the addressing of the function unit for data sending and data receiving, respectively, and activates one of the inputs of the sending and receiving gate means, respectively.

The start pulse source SP comprises an interrupt signal unit IU and start devices SD$e$ and SD$r$ for starting the associated computers E, R, respectively. In the figures the interrupt signal unit IU is shown as an added function unit, which in the usual manner comprises an interface connected to the bus system of the executive computer. However, this does not mean that the impedance load of the bus system is further increased, since the interrupt signal unit is in reality included in an interrupt unit of the computers which is not shown on the figures for the sake of clearness. Each real-time computer for controlling a telecommunication system is provided with such an interrupt unit known per se for receiving incoming interrupt signals, to establish orders of priority and to supply for each priority change a jump instruction which in the instruction register sequence selects a beginning instruction associated to the respective priority level.

In a system consisting of an executive computer and a reserve computer a primary start pulse $ps$ for the start of the parallel-synchronous operation causes such an interrupt signal in each of the computers. To explain the principle initiation of the start process for the parallel work of the computers there is shown in the figures a flip-flop F, a calling device CD and a decoder DEC. Flip-flop F is by the primary start pulse $ps$ put to the first stable state a by the aid of which the calling device is activated. The instruction register sequence includes a register which is selected regularly and stores an instruction to transfer eventual interrupt signals of the interrupt unit. An interrupt signal obtained from calling device CD is given a priority in the executive computer E, for example, so that when a real-time controlling instruction which is in progress is finished an instruction register is selected which contains an instruction to transfer a coded ready-signal for a co-operation start to the interrupt signal unit whose decoder DEC converts the ready-signal to a secondary start pulse $ss$, which sets said flip-flop F to the second stable state $b$. Accordingly without determining definite construction elements, the task of the interrupt signal unit consists in, upon activation by a primary start pulse $ps$, interrupting the executive work in progress and generating a secondary start pulse $ps$ for the parallel operation of the computers. If the example mentioned in the beginning is used, i.e. that a processing cycle for an instruction comprises four timing phases and that a function unit addressed for data reception registers sent data during the last timing phase of the processing cycle, the secondary start pulse is obtained on the output of the interrupt signal unit during the fourth timing phase in the processing cycle for the instruction to transfer the ready-signal.

In other words, periodically a specific register BIR*e* of function FU*e* which contains the instruction register sequence IRS*e* is periodically read. The contents of that register are fed via the order lines *obc* to interrogate the calling device CD for its receipt of a signal from flip-flop F in response to a *ps* signal. If such signal is present the calling device CD sends another signal via data lines *dbe* to the function unit containing the instruction register sequence IRS*e* which instructs another function unit to send via data bus *dbe* a start code to decode DEC.

The start devices SD*e* and SD*r* included in the start pulse source SP as well as the interrupt signal unit IU are arrangements which are typically included in separate working computers. Start instruction registers SIR and first and second phase generators PG1 and PG2 stepped by the clock generator are shown in the figures in order to explain the principle initiation of the separate operations.

The start instruction registers SIR store start instructions which are of the jump instruction type. A start instruction transferred to an order bus addresses the function unit provided with the instruction register sequence and selects the above said beginning instruction register BIR, eventually via a number of so called blind instruction registers BLR as will be explained in connection with FIG. 4.

The first phase generator PG1 comprises a shift register for step-by-step transfer of an input pulse, for example the secondary start pulse *ps*, such step-by-step transfer for the different realizations of the proposed apparatus is used to constitute parts of a time-delay as will be described below.

The second phase generator PG2 comprises a cyclic or ring counter, the number of steps of which corresponds to the number of timing phases in a processing cycle. According to the example used so far the second phase generator consequently has four steps which cyclically activate the outputs of the generator connected to the respective timing bus. The cyclic counter is provided with an input *o* for initializing the counter to state zero until an activated input *s* starts the stepping. In this manner the logical state of the timing bus in the unified-bus system defines the processing cycles and their division in timing phases.

In the embodiment shown in FIG. 3 the first phase generator PG1*e* of the executive computer is connected to the output of the interrupt signal unit IU which emits the secondary start pulse *ss*. To a first OR-gate OR1*e* are connected such outputs of the phase generator which are activated during the processing cycle which follows immediately after the processing cycle to transport the ready-signal for the co-operation start to the interrupt signal unit. This transport cycle in its last timing phase results in the secondary start pulse. A pulse coming from said OR-gate OR1*e* lasts a whole processing cycle and activates a first read-out gate means AND1*e* via which the start instruction stored in the start instruction register SIR*e* is transferred to the order bus *obe* of the executive computer. In this manner the processing cycles go on in the executive computer E without any interruption during the change from separate to parallel operation. No initializing and restarting of the second phase generator PG2*e* occurs and the processing of the start instruction is controlled in normal manner via the timing bus *tbe* of the executive computer E. If in connection with co-operation start it is desired to redetermine for the executive computer E the processing cycles and their timing phases, the embodiment according to FIG. 3 is modified for example as explained in connection with FIG. 4.

The second phase generator PG2*r* of the reserve computer R is however always initialized in connection with the start of the parallel operation. According to FIG. 3 the first stable state *a* in said flip-flop F activates the zero setting of the phase generator. Consequently, in the reserve computer R, an eventual operation which is in progress is stopped. Otherwise the start of the reserve computer R proceeds principally in correspondence to the start of the executive computer, the difference is only that the first phase generator PG1*r* of the reserve computer together with an OR-gate OR1*r* generate a pulse which is delayed in time relative to said pulse obtained from the OR-gate OR1*e*. The time-delay is according to FIG. 3 partly achieved by a delay element DE which is connected between the output of the interrupt signal unit and the input of the first phase generator PG1*r* in the reserve computer R and partly by a number of shift register steps of the phase generator PG1*r* before the shift register steps which activate the OR-gate OR1*r* and of which the first one starts the second phase generator PG2*r* of the reserve computer. In another possible embodiment, not shown, both the first phase generators PG1*e* and PG1*r* can be designed exactly alike, the time-delay element DE achieving the whole time-delay.

The time-delay element DE can be, for example, a time-delay line, a special shift register which is stepped by special clock pulses or by the timing pulses of the clock generator CG, or a transfer channel, the construction of which mainly corresponds to the construction of the data transfer channel DCH arranged between the computers, a first phase generator PG1 common for both computers eventually in combination with so called blind instruction registers BLR as will be explained in connection with FIG. 4, or in the form of the data transfer channel DCH itself as will be explained in connection with FIG. 5. If no blind instruction registers are used, the time-delay element DE is dimensioned independent of the chosen construction so that the total time-delay between the pulses of the OR-gates or OR1*e* and OR1*r* mainly corresponds to the amount of time it takes for arbitrary data to be transferred from the data bus *dbe* of the executive computer E via the data transfer channel DCH to the data bus *dbr* of the reserve computer R.

In the embodiment according to FIG. 4 the OR-gates OR1*e* and OR1*r* are connected to a common first phase generator PG1 through which is stepped the secondary start pulse *ss* which for this embodiment also initializes both second phase generators PG2*e* and PG2*r*. After a number of shifts in the phase generator PG1, the second phase generator PG2*e* of the executive computer and the activation of the OR-gate OR1*e* are started. After a further number of shifts mainly corresponding to the transfer time of the data transfer channel DCH reduced by a number of processing cycles, the second phase generator PG2*r* of the reserve computer and the activation of the OR-gate OR1*r* are started. The eventual reduction with a number of processing cycles is used if the necessary time-delay exceeds one processing cycle and if the instruction register sequence of the reserve computer R comprises a number of so called blind instruction registers. By a blind instruction register is meant an instruction register storing an instruction is which only selects another determined instruction register, the selecting of a blind instruction register having the result of an interruption in the work of the computer equal to one processing cycle. In FIG. 4 there is shown a blind instruction register BLR belonging to the instruction register sequence of the reserve computer R. The blind instruction register contains an instruction to select the above beginning instruction register BIRr. In this case the start instruction register SIRr of the start device SDr of the reserve computer contains an instruction to select said blind instruction register BLR.

In the embodiment in FIG. 5, the data transfer channel DCH itself is used to insure that the start pulse source SP initiates the start process for the reserve computer R delayed in time in relation to the start process for the executive computer E. The secondary start pulse ss is stepped through the first phase generator PG1e of the executive computer E and used to determine two uninterrupted processing cycles following, the secondary start pulse. During the later cycle the OR-gate OR1e is activated for reading-out of the start instruction to the order bus obe of the executive computer E as explained in connection with FIG. 3. By means of a pulse which is generated from the phase generator PG1e during the first timing phase of the processing cycle following immediately after the secondary start pulse, the gating means G2 is activated via the control memory CM of the data transfer channel DCH. The gate means G2 belongs to the transfer logic means TL. Thus the data transfer channel DCH is connected to the data bus of the reserve computer R. During the rest of said processing cycle following immediately after the secondary start pulse the phase generator PG1e activates via a second OR-gate OR2 and via a second read-out gate means AND2 the reading of the start instruction to the data bus dbe of the executive computer E, so that the start instruction is treated in the same way as data which during an instruction processing are transferred to an arbitrary function unit. The start device SRr of the reserve computer whose second phase generator PG2r was initialized in one of the above said manners, comprises a start comparison device provided with inputs connected to the start instruction register SIRr and to the data bus of the reserve computer R. The start comparison device is symbolized in FIG. 5 by an EXCLUSIVE-OR means EXORs provided with inverting output. When the start instruction entering via the data transfer channel is recognized as the start instruction stored in the start instruction register SIRr, the start comparison device sends an equality signal which is stepped through the first phase generator PG1r of the reserve computer. By waiting a suitable number of shifts in the shift register before the phase generator PG1r starts, the phase generator PG2r, before it starts to activate the OR-gate OR1r and before it deactivates the second gate means G2, there is obtained a possibility to fine adjust the total time-delay, so that an optimal co-operation is achieved. In other words, the data transferred from the executive computer, e.g. updating data, are received in the reserve computer faultlessly during the timing phase intended for data reception of the function unit which is addressed because of an instruction transferred from the instruction register sequence of the reserve computer to the order bus of the reserve computer. In FIG. 5 it has as up to now been assumed that each processing cycle comprises four timing phases and that data are sent to the respective data bus during the three last phases. Furthermore it has been assumed that best updating conditions are achieved if the equality signal occurs two timing phases before the processing of the start instruction of the reserve computer.

The embodiment according to FIG. 5 causes the start process to last a processing cycle more than in the embodiment according to FIG. 3, but has less demands on the time and temperature dependence of the hardware elements of the transfer channel.

With the aid of all the realizations for the proposed apparatus to facilitate the co-operation between two unified-bus computers there is achieved the results that the instructions of the reserve computer R during all the co-operation are processed parallel-synchronously, but delayed in time in comparison with the instructions of the executive computer, the time-delay being such that, in a symbolical sense, the reserve computer R during the processing cycles of the updating does not notice that received data are not sent from one of its own function units, but from the corresponding function unit of the executive computer.

By the use of a start pulse source there is achieved the results that the logical state of the output of the data transfer channel corresponds at least during the timing phases intended for data reception in the reserve computer, according to the example adapted so far phase four in each processing cycle, to the logical state of the data bus of the reserve computer R. This result is used for carrying out the introductory continuous comparison between the instantaneous data produced by the computers with the aid of a drift comparison device as shown in FIG. 4 where it is symbolized mainly by an EXCLUSIVE-OR means KM which during the timing phases intended for data reception in the reserve computer R is fed with said two logical states and which upon a difference of the states causes alarm AL to generate an alarm signal.

The drift comparison device KM in combination with the control memories CM, of which one is shown on FIG. 4, has the advantage that one can carry out a diagnosis of a faulty unified-bus computer with the help of an identical but fault-free unified-bus computer. The purpose of the diagnosis is to determine the module which is faulty, so that the repair of the computer only consists in replacing the faulty module with a fault-free module. The diagnosis begins with a parallel drift start according to the previous description, the faulty computer working as the reserve computer while the fault-free computer works as the executive computer, which in normal manner in separate operation controls for example a telecommunication equipment. After this the faulty computer is updated, a transfer state is recorded in all the control memories CM. Upon a following complete change to a normal parallel-synchronous co-operation between the computers, the drift comparison device KM would generate an alarm signal when the function unit which produces faulty data is addressed for data sending. However, a successive change to a normal co-operation, meaning for example that the number of function units with a recorded transfer state is more and more reduced manually or automatically with suitable time intervals, causes however no alarm signal as long as the transfer state is recorded for the faulty function unit. The successive reduction of recorded transfer states consequently constitutes to great extent a simple diagnosis method, an alarm signal defining the function unit as faulty whose transfer state has been invalidated last before the alarm. There are many modifications of this diagnosis method which use the possibility to record transfer states separately in the function units. One modification example is to maintain all transfer states except one at a time, or to divide the function units in groups and first define the group which contains the faulty function unit. Such division in groups shortens the average time for diagnosis, although a new updating must be carried out before the diagnosis within the group including the faulty function unit is started.

Summing up, such a co-operation of two unified-bus computers is facilitated by the aid of the proposed and above described method, that one of the computers updates with its instantly produced data the other computer, that the computers mutually monitor each other in the manner that their instantaneous data continuously and completely are compared with each other, and that a fault-free separate real-time controlling computer carries out a diagnosis on a faulty computer in order to determine the faulty function unit wherein solely instantaneous data of the real-time controlling is used.

What is claimed is:

1. In a system having:

a clock generator for generating clock pulses, an excutive computer having a bus system including a timing bus, an order bus, a data bus, and a plurality of function units, one of the function units having a set of selectable registers for storing instructions to be read and processed sequentially during processing cycles, each consisting of a given number of equal timing phases established by the clock generator and having means for selecting a register in response to a received address, said sets of registers storing the instructions for performing a procesing routine with a first of said registers storing the first instruction of said processing routine, said function units being connected to said timing bus for receiving timing signals, being connected to said data bus to receive and/or transmit data, and being connected to said order bus to receive and/or transmit instructions and/or addresses, and, a reserve computer for working in parallel synchronism with the executive computer to perform the same processing routine, the reserve computer having a timing bus, an order bus, a data bus, and a plurality of function units, one of the function units having a set of selectable registers for storing instructions to be read and processed sequentially during processing cycles, each consisting of a given number of equal timing phases established by the clock generator and having means for selecting a register in reponse to a received address, said sets of registers storing the instructions for performing a processing routine with a first of said registers storing the first instruction of said processing routine, said function units being connected to said timing bus for receiving timing signals, being connected to said data bus to receive and/or transmit data, and being connected to said order bus to receive and/or transmit instructions and/or addresses;

the improvement comprising apparatus for controlling and initiating the parallel synchronous operation of the computers on the same data, said apparatus comprising, a unidirectional data transfer channel having an input and an output, means for connecting said input to the data bus of the executive computer, means for connecting said output to the data bus of the reserve computer, said data transfer channel introducing a known time delay in signals representing data transferred from the executive computer to the reserve computer, said time delay being greater than one of said timing phases, initial start means for generating a start signal to indicate the start of cooperation between the two computers, executive computer start means having an input and an output connected to the order bus of the executive computer, means for connecting the input of said executive computer start means to the initial start means, said executive computer start means further having means responsive to the receipt of said start signal at the input of said executive computer start means for transmitting from the output of said executive computer start means the address of said first of the registers of said set associated with the executive computer to said one function unit of the executive computer, time delay means for transmitting a delayed start signal from a time-delay output after a period of time substantially equal to said known time delay after the occurrence of the start signal, and reserve computer start means having an input and an output connected to the order bus of the reserve computer, means for connecting the input of said reserve computer start means to the time delay output of said time delay means for receiving the delayed start signal, said reserve computer start means further having means responsive to the receipt of the delayed start signal for transmitting from the output of said reserve computer start means the address of said first of the registers of said set associated with the reserve computer to said one function unit of the reserve computer, so that the transfer of the address of said first register from said reserve computer start means is delayed with respect to the transfer of the address of said first register from said executive computer start means by a time effectively equal to the time delay introduced by said data transferring channel so that each computer processes the same data with the same instructions.

2. Apparatus according to claim 1 wherein said time-delay means comprises a delay line.

3. Apparatus according to claim 1 wherein said time delay means includes a shift register connected to the clock generator for stepping said shift register, the product of the period of the clock pulses and a number of the register steps being substantially equal to the time delay introduced by said data transfer channel.

4. Apparatus according to claim 1 further comprising means for comparing the data transferred by said data transfer channel with the data on the data bus for the reserve computer and means for generating an alarm when the data are different.

5. The apparatus according to claim 1 wherein said initial start means comprises a source of a primary start pulse, an interrupt unit interconnected with one of the buses of the executive computer, said interrupt unit being adapted to receive a primary start pulse to interrupt the operation of the executive computer, and means for generating said start signal, and wherein said means responsive to the receipt of said start signal of both said executive computer start means and said reserve computer start means respectively include a register for storing the address of said first of the registers of the respective sets of registers.

6. Apparatus according to claim 1 wherein said executive computer start means further comprises a phase generator means having an input connected to the clock generator and an output connected to the timing bus of the executive computer for generating the timing phases of the processing cycles of said instructions processed by the executive computer, said reserve computer start means further comprises a phase generator means having an input connected to the clock generator and an output connected to the timing bus of the reserve computer for generating the timing phases of the processing cycles of said instructions processed by the reserve computer.

7. Apparatus according to claim 6 further comprising means responsive to the start signal for activating the phase generator means of said executive computer start means, and means responsive to the delayed start signal for activating the phase generator means of said reserve computer start means.

8. Apparatus according to claim 7 wherein said time delay means is a delay line having an input connected to said initial start means and an output, and means connecting said output to said means for activating the phase generator means of said reserve computer start means.

9. Apparatus according to claim 6 wherein said time delay means is a shift register which is connected to said initial start means and is shifted by the clock generator and has a first output connected to said means for activating the phase generator of said executive computer start means and a second output, downstream from said first output, connected to said means for activating the phase generator of said reserve computer start means so that the activation of the phase generator of the reserve computer start means occurs after the activation of the phase generator of said executive computer start means.

10. Apparatus according to claim 1 wherein said means for connecting the output of said data transfer channel to the data bus of the reserve computer comprises transfer control means having a first input connected to the output of said data transfer channel and an output connected to the data bus of the reserve computer for controlling the passage of signals from said data transfer channel to the data bus of the reserve computer.

11. Apparatus according to claim 10 wherein said transfer control means has a second input connected to the data bus of the reserve computer and further comprises means for selecting which of two inputs of the transfer control means passes signals to the data bus of the reserve computer.

12. In a twin computer system timed by a common clock generator of clock pulses and interconnectable by a channel means which introduces a time delay in units of data traversing said channel means greater than a clock pulse period, wherein first and second computers process, in parallel, units of data from a plurality of operational units with the first of said computers being the executive computer and the second the reserve computer, and wherein said computers are identical and each comprises both a first function unit and a second function unit interconnected by a bus system including order and data buses, the method of initiating the operation of both computers to process the same data comprising the steps of starting the first computer to process units of data, starting the second computer to process units of data a given period of time after the starting of the first computer, and actively connecting unidirectionally the data bus of the first computer to the data bus of the second computer for a certain length of time whereby a unit of data being transferred from the first function unit of the first computer to the second function unit of the first computer is also transferred to the second function unit of the second computer which corresponds to said second function unit of the first computer, so that the second computer is initially loaded with units of data being processed by the first computer, the given period of time the second computer is started after the first computer being substantially equal to the time required for a unit of data to be transferred from the data bus of the first computer to the data bus of the second computer.

* * * * *